C. B. STEELE.
MOTOR VEHICLE.
APPLICATION FILED JUNE 28, 1907.
1,191,132.
Patented July 11, 1916.
8 SHEETS—SHEET 1.
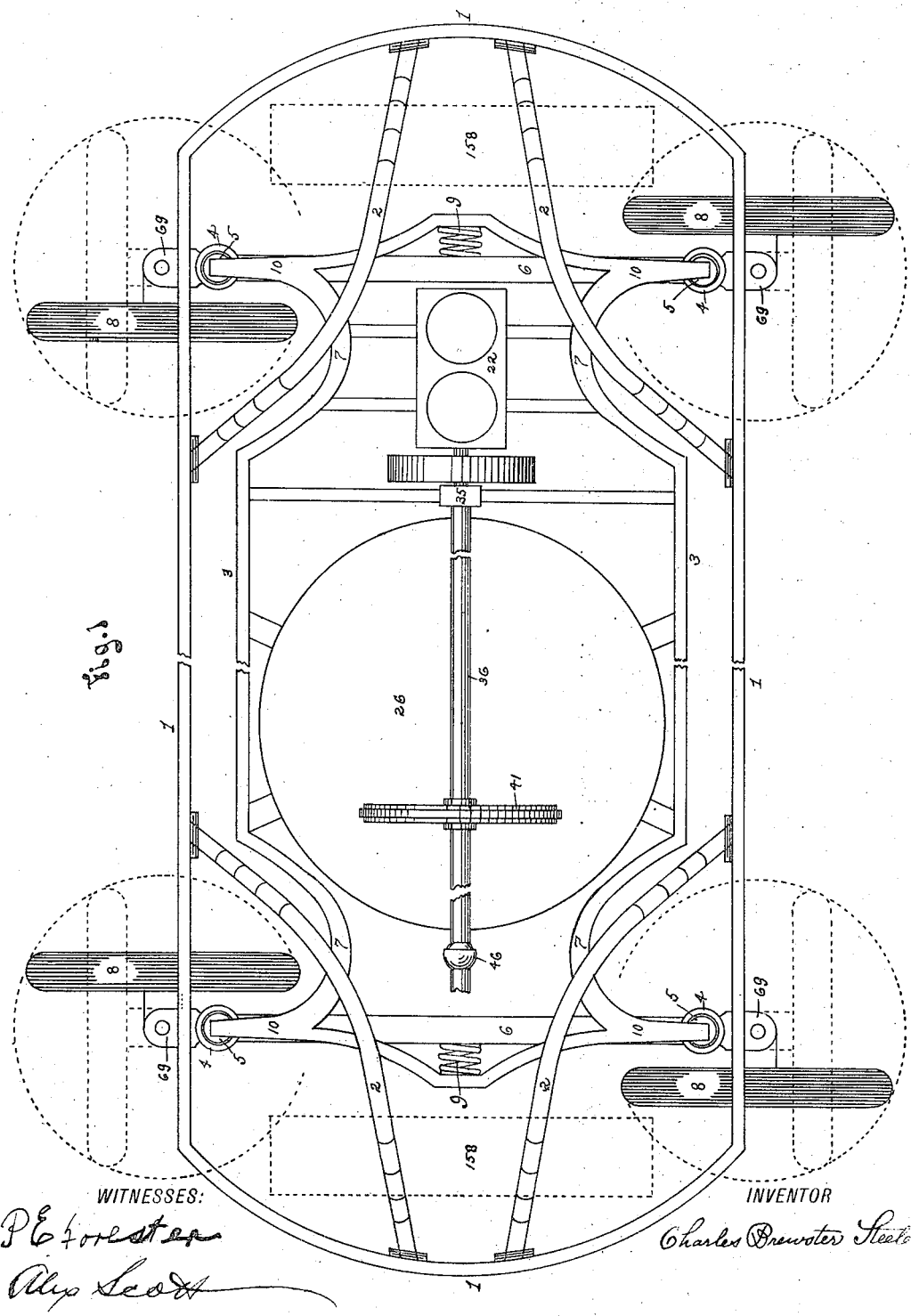

C. B. STEELE.
MOTOR VEHICLE.
APPLICATION FILED JUNE 28, 1907.
1,191,132.
Patented July 11, 1916.
8 SHEETS—SHEET 2.
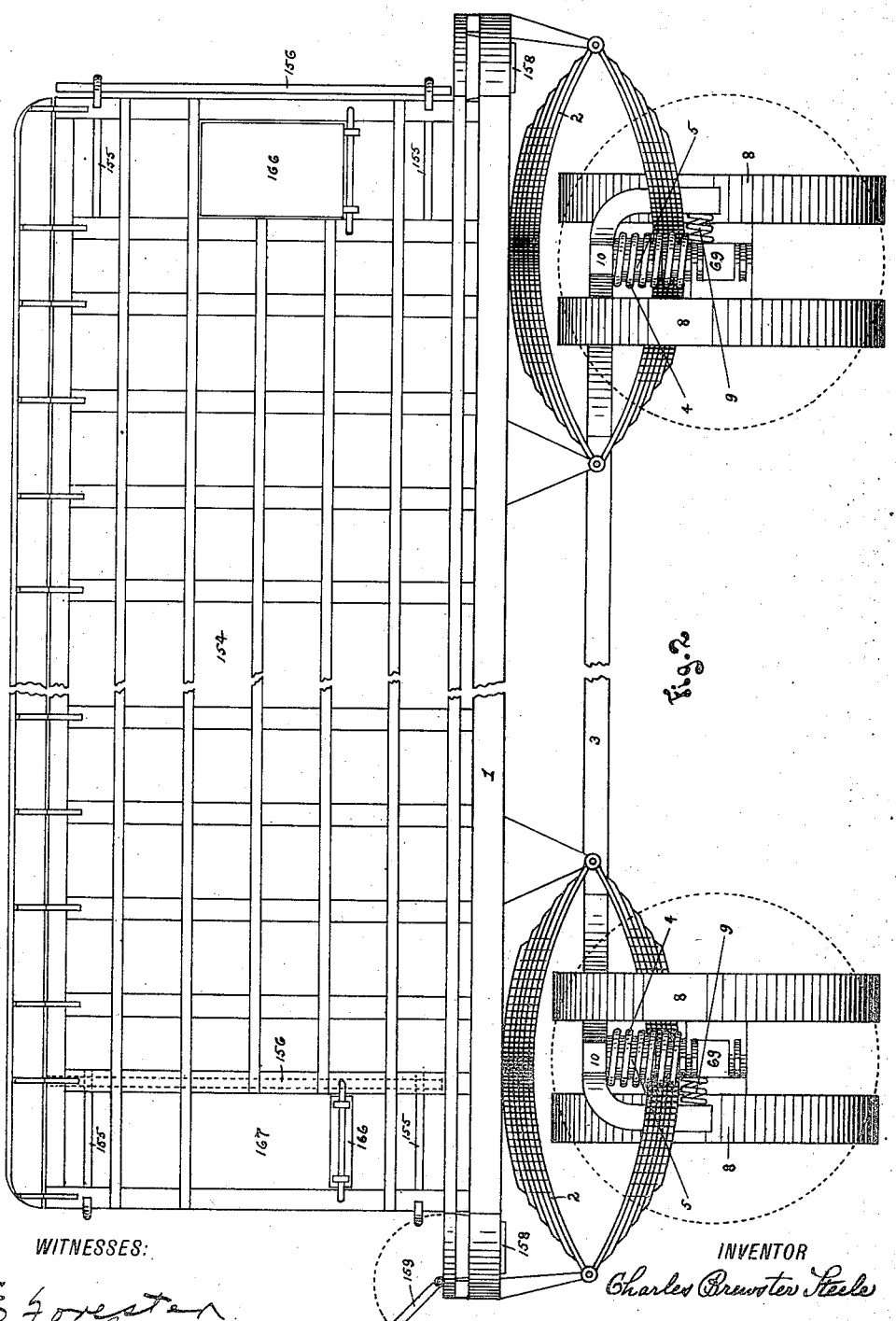
WITNESSES:
INVENTOR
Charles Brewster Steele

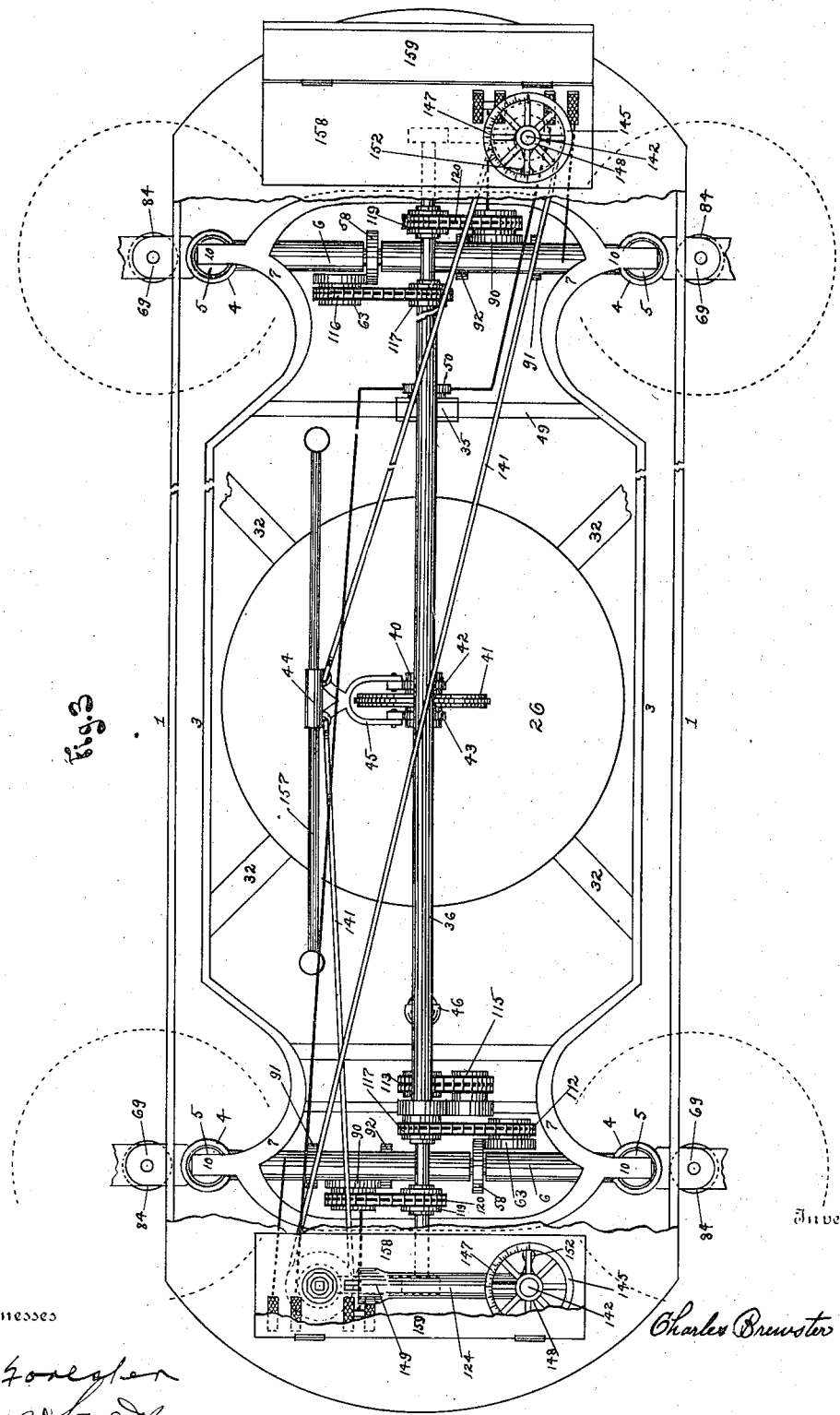

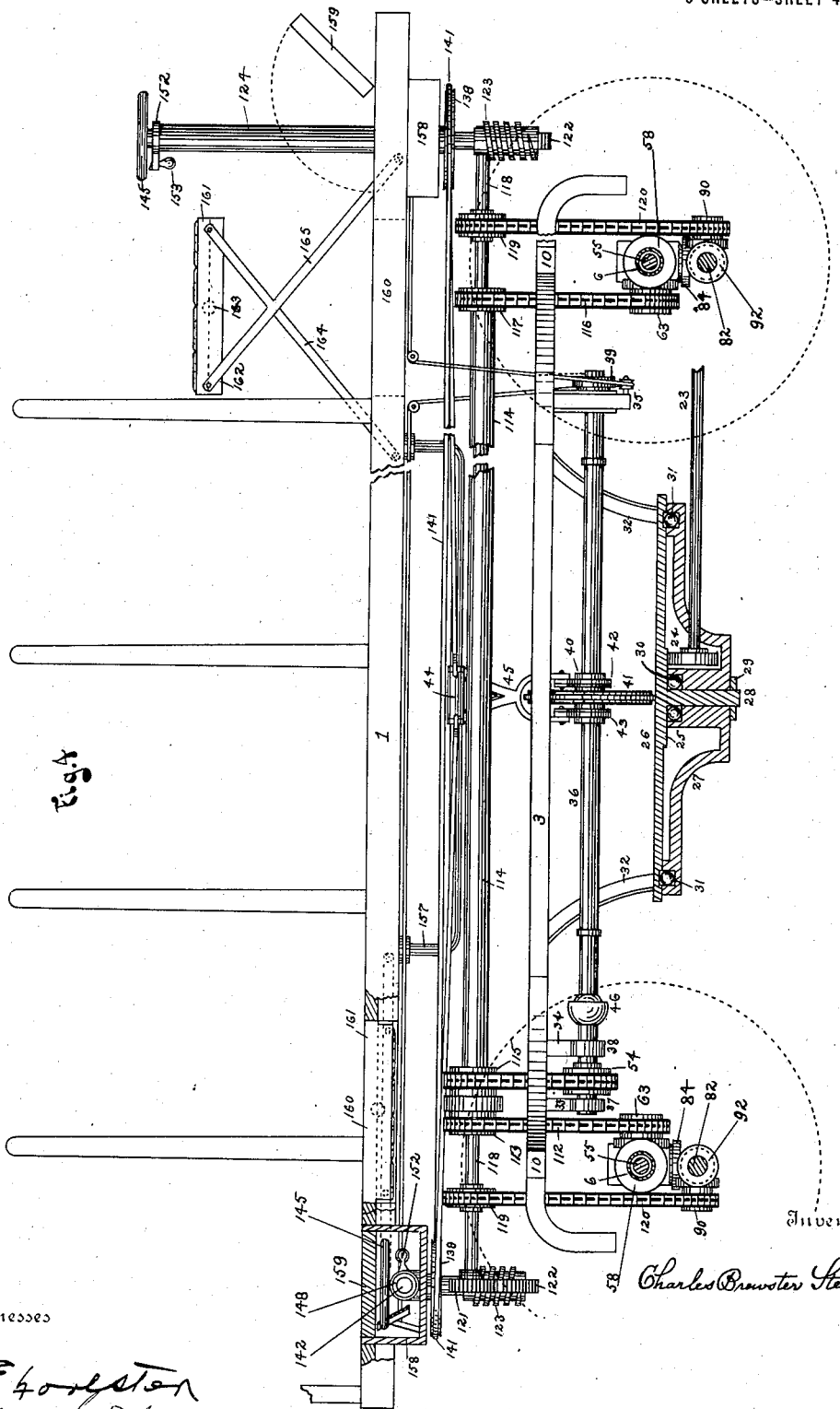

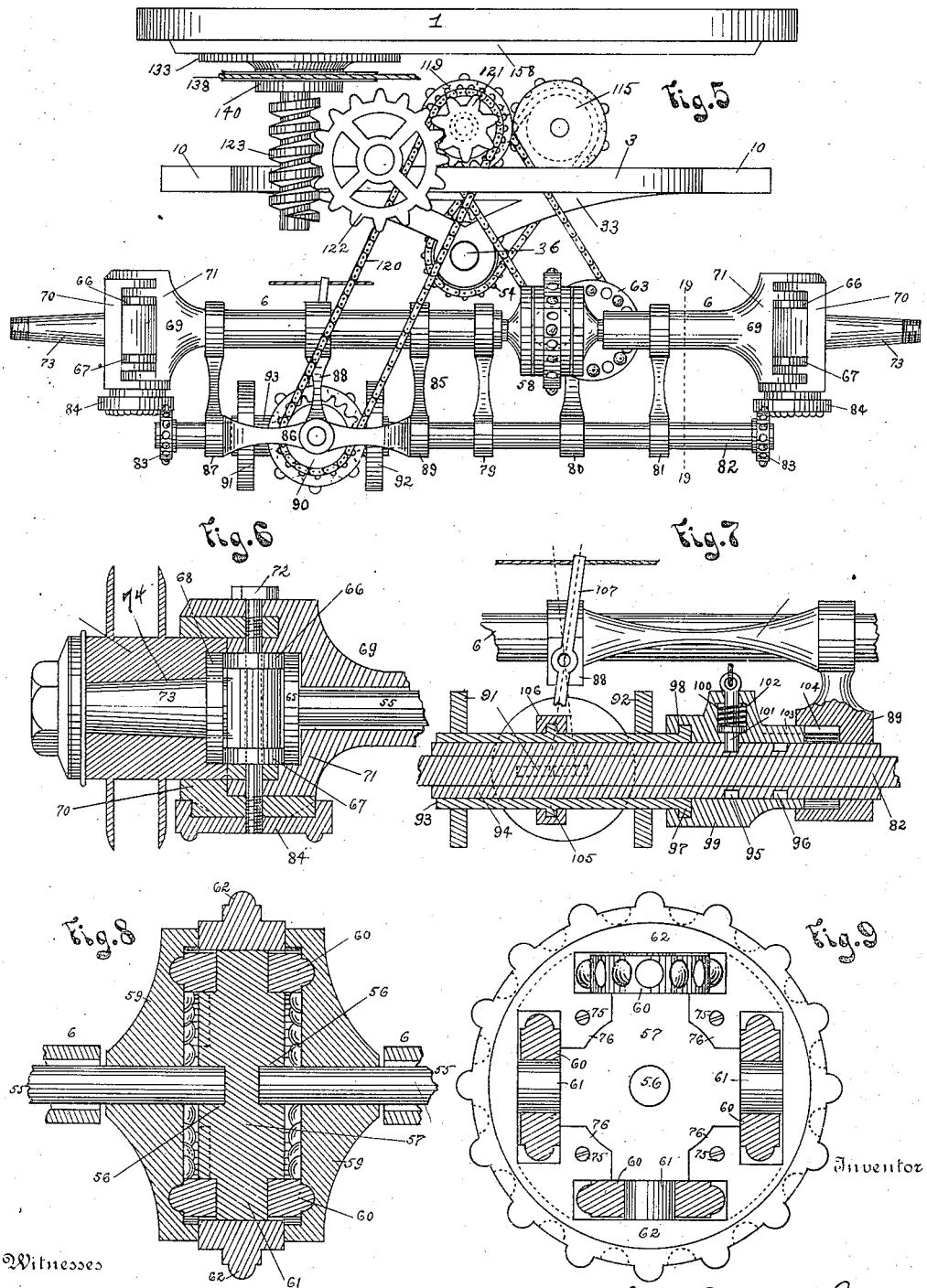

C. B. STEELE.
MOTOR VEHICLE.
APPLICATION FILED JUNE 28, 1907.
1,191,132.
Patented July 11, 1916.
8 SHEETS—SHEET 6.
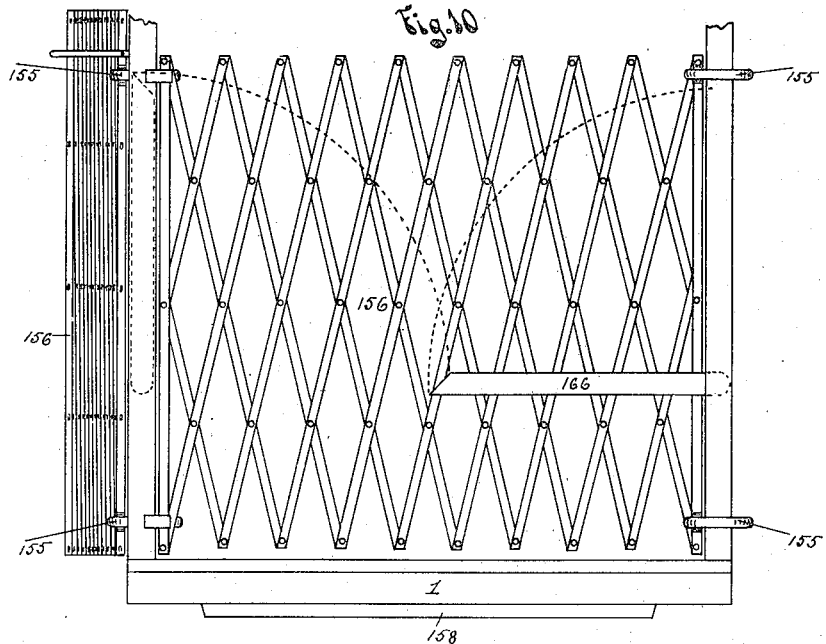
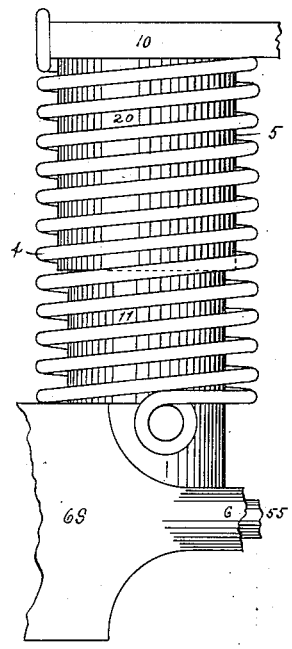
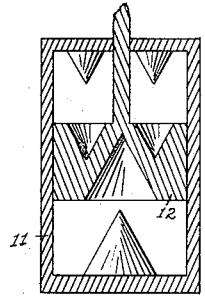
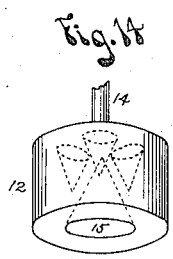
Inventor
Charles Brewster Steele C. B. STEELE.
MOTOR VEHICLE.
APPLICATION FILED JUNE 28, 1907.
1,191,132.
Patented July 11, 1916.
8 SHEETS—SHEET 7.
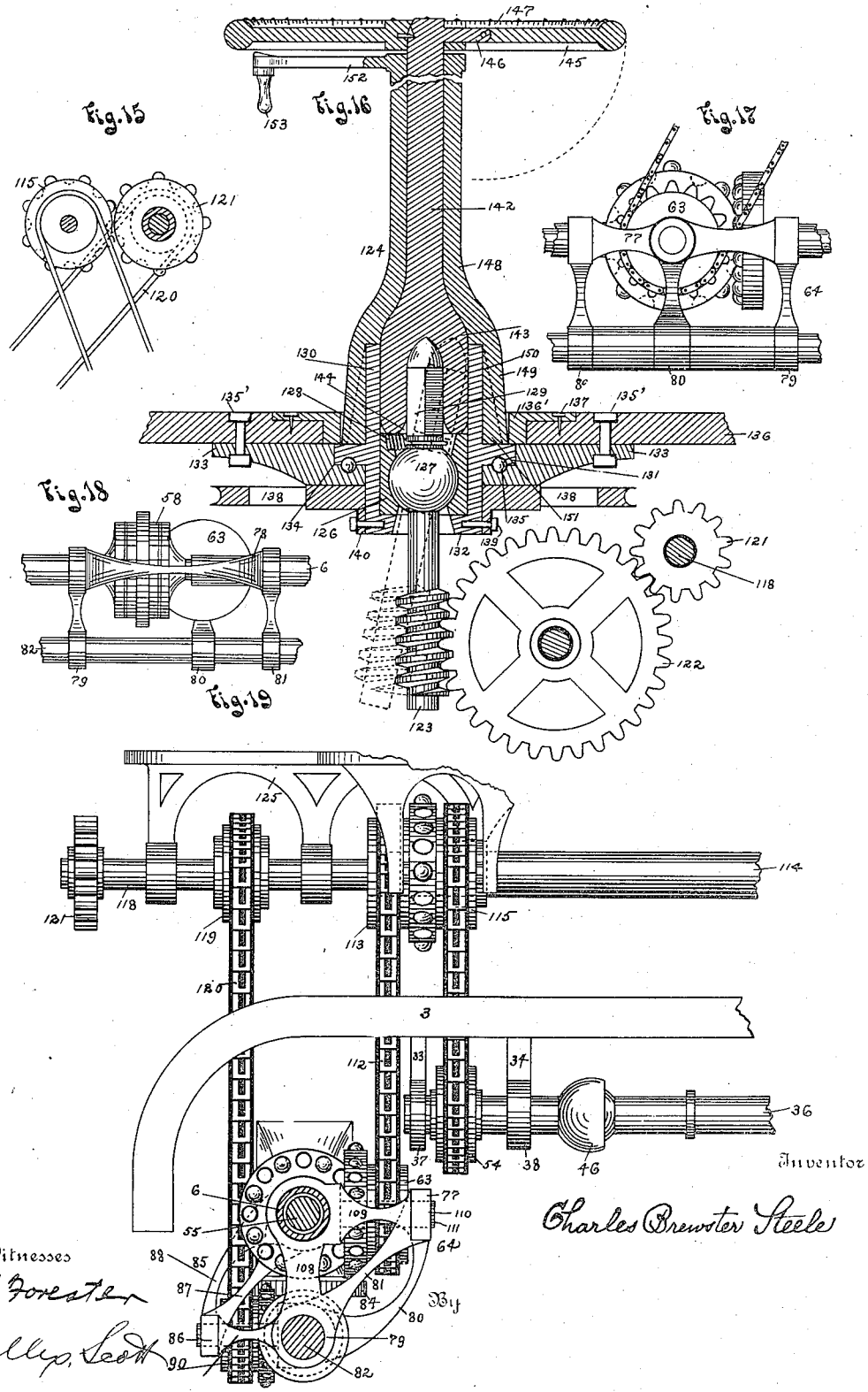

C. B. STEELE.
MOTOR VEHICLE.
APPLICATION FILED JUNE 28, 1907.
1,191,132.
Patented July 11, 1916.
8 SHEETS—SHEET 8.
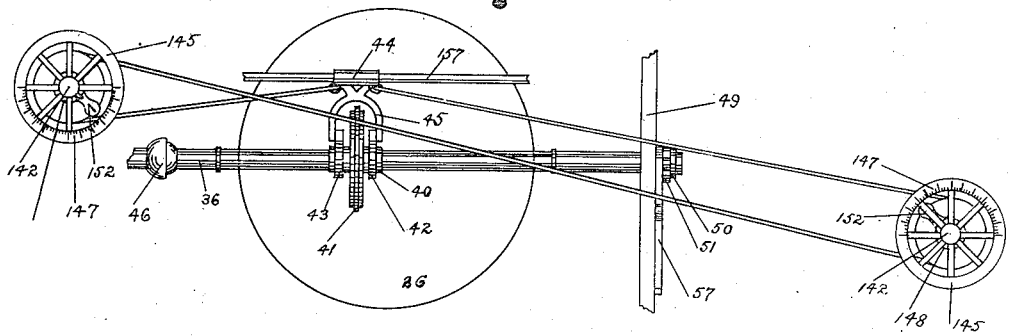
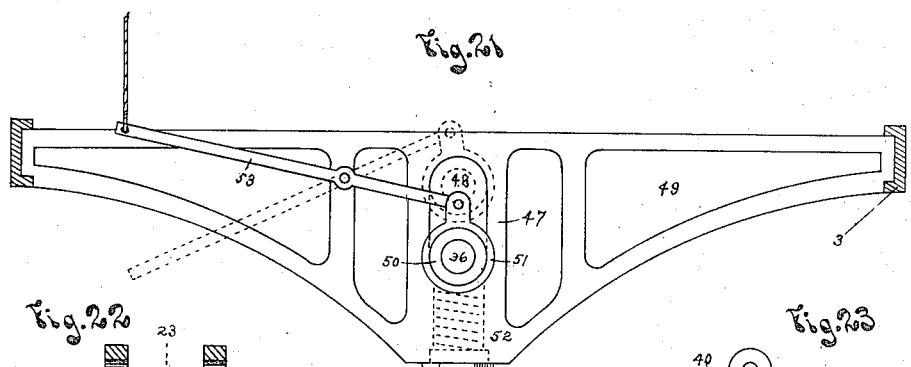
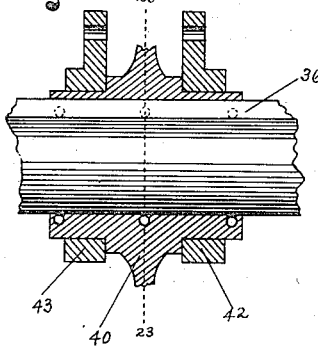
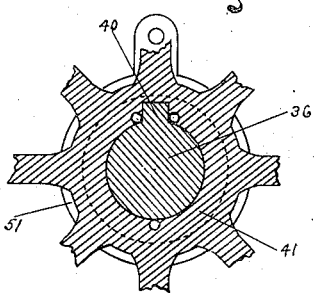
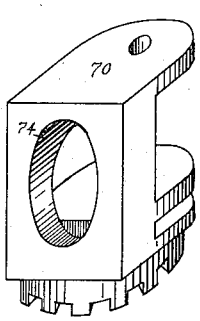
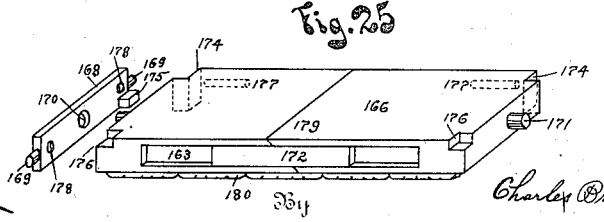
Witnesses
P. E. Forester
Alx. Scott
Inventor
Charles Brewster Steele
By

UNITED STATES PATENT OFFICE.

CHARLES BREWSTER STEELE, OF NEW YORK, N. Y.

MOTOR-VEHICLE.

1,191,132.

Specification of Letters Patent.   Patented July 11, 1916.

Application filed June 28, 1907.   Serial No. 381,324.

*To all whom it may concern:*

Be it known that I, CHARLES BREWSTER STEELE, citizen of the United States, residing at New York, in the county of New York and State of New York, have invented certain new and useful Improvements in Motor-Vehicles, of which the following is a specification.

My invention is a vehicle, adapted to be propelled by any type of engine and any class of power, comprising a motor vehicle mercantile truck, possessing few parts, great strength, durability, reliability, efficiency, highest speed percentage with lowest percentage of horse-power, simplicity of management and operation, innovation of conveniences for the operator, minimum cost of maintenance, and consists broadly of the following elemental features:—an arrangement of running gear to allow the vehicle to be guided in any direction upon any radii of a circle from the center of its own axis; steering devices located at each end to enable the operator to drive the vehicle with equal facility from either end; a subsidiary frame supporting and so cushioning the motor, driving, and operating mechanism that the usual shocks and jars which disarrange said mechanism will be eliminated; complete isolation of the motor, the main power shaft, the transmission shaft, and the speed varying mechanism from the freight carrying platform; the mounting of the driving and steering shafts directly beneath the freight carrying platform, and flexibly connecting them to the live axles, steering axles, and transmission shaft, to allow relative movement of their respective parts; duplicate steering and speed changing posts forming duplicate speedometers; duplicate seats; duplicate gates; and duplicate housing repositories; all so constructed and secured that they may be easily, quickly, and conveniently adjusted into and out of operative position to enable the vehicle to be operated, with equal facility at either end, all of which is hereinafter more fully described in the specification, designated in the claims, and illustrated in the accompanying drawings, in which like numerals refer to like parts in the different figures, respectively.

Figure 1. is a plan view of skeletons of the platform, and subsidiary frame, showing their respective independent flexible supports adapted to isolate the motor, the transmission, and operating mechanism, from the freight and load carrying receptacle, constructed to permit the traction wheels to turn upon an angle of one hundred and eighty degrees. Fig. 2. is a side elevation showing the platform, and subsidiary frame, mounted on their respective independent flexible supports, the traction wheels turned at right angles to the axis of the frame, the duplicate operating and steering handles, repositories, the duplicate seats, and duplicate gates. Fig. 3. is a plan view of the motor-vehicle with the platform "broken out", showing the entire operating mechanism, the duplicate steering mechanism, and the duplicate housings for the operating and steering handles, constructed to permit the traction wheels to be turned upon any angle up to one hundred and eighty degrees. Fig. 4. is a side elevation of the motor vehicle, showing the driving, operating, and steering mechanism, and the duplicate housings, for the operating and steering handles, and duplicate seat housings. Fig. 5. is an elevation of one end of the vehicle, showing the driving, operating, and steering mechanism, an axle, its knuckles, differential gear, steering axle and supporting brackets, and alternative steering gear. Fig. 6. is a perpendicular section of a knuckle, with a hub on its spindle, and its operating gears. Fig. 7. is a perpendicular section of the steering axle, showing the alternative steering gear and its operating mechanism. Fig. 8. is a perpendicular section of the differential gear. Fig. 9. is a side elevation of the differential gear disk and its annular gear member, complementarily constructed to form openings for the pintle gears. Fig. 10. is an elevation of one end of the platform, showing one of the housings, the duplicate seats, and duplicate gates, in and out of operative positions, respectively. Fig. 11. is a side elevation of a dashpot and complementary spring, both fastened to the axle and subsidiary frame, respectively. Fig. 12. is a perpendicular section of a type of a dash-pot. Fig. 13. is a perpendicular section of a dash-pot and complementary spring, each fastened to the axle and subsidiary frame, respectively. Fig. 14. is a perspective view of a type of a dash-pot piston, showing its counterbalance cavities. Fig. 15. is a side elevation, showing relative positions of a transmission and driving gear. Fig. 16. is a perpendicular section of one of the duplicate steering and operating posts and handles and mechanism, showing a worm gear in and out of operative position. Fig. 17, is an end elevation of a portion of an axle supporting a bracket and right angle driving gear. Fig. 18, is an elevation, showing manner of keeping the differential gear in operative position with the traction wheels, by means of the axle and brace. Fig. 19, is a side elevation of the driving, operating, and steering mechanism, their respective shaft and gear brackets, showing the axles in cross section at a point indicated by dotted line 19—19 in Fig. 5. Fig. 20, is a plan view of the speed varying mechanism, forming a speedometer. Fig. 21, is a cross section of the side beams of the subsidiary frame, showing a bracket, and transmission shaft operative mechanism. Fig. 22, is a perpendicular section of the hub of the transmission wheel, shaft, and spline. Fig. 23, is a cross section of the same on dotted line 23—23 in Fig. 22. Fig. 24, is a perspective view of the outer half of the two-part turning knuckle, showing the turn-knuckle alternate jaws, and its central office. Fig. 25, is a perspective view of the reversible two-part swivel-seat.

The numeral 1, represents the freight carrying platform, or body of the vehicle, independently supported on the peculiarly curved springs 2, which are fastened, by any suitable means, to the end and side beams of the platform, substantially, in the position shown, affording a better distribution of weight and resiliency, thus, completely separating this member of the vehicle, which receives the heavier shocks and jars of the road, in addition to those of freight handling, from the member carrying the motor, driving, and operating mechanism. The numeral 3, represents the subsidiary frame, which is independently and compoundly cushioned and supported on the springs 4, and dash-pots 5, which are both secured to the said subsidiary frame and the axles 6, respectively.

The frame 3, is made with recesses, or wheel-ports 7, formed, to, complementarily, with the curved springs 2, receive the traction wheels 8, when turned upon any steering angle, and permit the vehicle to be guided in any direction upon any radii of a circle from the center of its own axis. The subsidiary frame may also have its end beams curved outwardly and downwardly, as shown, and coöperatively, with the axles, form bearing means to retain the buffers 9, which may also be of any suitable type. The arms 10, form the subsidiary frame supports, and extend outwardly beyond the line of the side beams, so as to increase its equilibrial balance, reposing on the springs 4, and the dash-pots 5, which are each rigidly and independently secured to the said subsidiary frame and the axles 6, both co-acting to cushion the said frame, and, yet, their independent movement permitting the dash-pots to check and arrest, the rebound of either resilient movement of the frame and prevent shocks and jars to the mechanism mounted upon it. The springs 4, may be helical or of any suitable form.

The dash-pots 5, are composed of an inner cylinder 11, one end of which is removably secured, to enable the introduction of the piston 12, the other end of which is provided with a perforation 13, through which passes the piston rod 14, the piston being provided with a conical depression, 15, on its under side, and a plurality of conical depressions, 16, on its upper side. Through the piston is a perforation 17, in which is located a valve 18, opening upwardly, and a second perforation 19, into which passes a slotted screw for varying the size of the opening, the piston rod being secured to the head of the outer cylinder, 20, which telescopes over the inner cylinder 11, forming the air chamber 21. The dash-pots are secured to the axle 6, and the subsidiary frame 3, by any well known means. Outside of the dash-pots is placed a coil spring, 4, also secured to the axle 6, and the subsidiary frame 3. The inner cylinder of the dash-pot is filled with a non-evaporating liquid, the upper chamber 21, being filled with air. Whenever the vehicle meets an obstruction, thereby, raising the axle, the cylinder 11, will be suddenly raised, compressing the spring, and forcing the liquid beneath the piston through the valve port 17, (raising the valve 18), into the chamber 21, and above the piston, and the subsidiary frame with its load, on account of its inertia, will not be moved to any appreciable extent. As soon as the traction wheel has passed the obstruction, the weight on the subsidiary frame, and the tension of the spring, will exert its force to return the piston to its normal position, but its movement cannot be quicker than is permitted by the passage of the liquid through the regulated port, 19, thus preventing the usual shaking of the subsidiary frame, which has such a destructive effect upon the operative mechanism.

The subsidiary frame supports and carries the motor, 22, mounted as near as possible to the surface of the roadway, the crank shaft 23, provided with a gear 24, which gears with the gear 25, on the under side of the speed disk 26, the said gear 25, being so located that the speed of the disk may have relative regulation, or the speed disk may have a graduated series of gears, and the crank shaft be telescoped to accommodate the disk to gear with any respective gear of the disk series, and raise or lower the gear, and change the motor speed of the disk. Said disk is pivotally rotatable on the bracket 27, which may be of any suitable form, by the pivot 28, secured by a locknut 29, and has a central ball-bearing, 30, and a ball bearing 31, near its periphery, and the bracket is secured to the subsidiary frame by the braces 32, the outer walls of the bracket forming a casing, and support, for the ball bearings and the crank gear. Positioned above, and longitudinally across the speed disk, and secured by the brace-brackets, 33, 34, and 35, is the transmission shaft, 36, secured and rotatable in the bearings, 37, 38, 39 said shaft having a splined slidable sleeve, 40, to which is rigidly secured the transmission-wheel, 41. To said sleeve are attached the dual collars, 42, 43, which are flexibly connected to the guide, 44, by the flexible guide member, 45. The shaft 36, has a universal joint 46, near one end, and the oscillating joint, 47, at its other end, the oscillating joint being formed, by the bearing slot, 48, in the brace-bracket 49, the bearing 50, and the collar 51, the slot, and universal joint, permitting the shaft, 36, to move back and forth and oscillate, by the operative action of the spring, 52, and the lever 53. The shaft, 36, has a gear 54, at one end, flexibly connected by an endless chain to the intermediate compound driving gear, 115.

Commercial vehicles, by their weight and purposes, are deprived of the use and resiliency of air cushioned tires, and their motors are subject to not only the "rack" of the road, but, the ruinous shocks and jars of loading and unloading freight, conditions, that have heretofore made the use of internal combustion engines, practically, prohibitive. My construction, resiliently isolating the two carrying members, makes the freight ride more easily, eliminates the platform vibrations from the mechanism, the compound cushioning of the subsidiary frame, and its anti-recoil and anti-rebound provision, allows the motor and the operating machinery to be cushion poised between the resilient vibrations, and saved all jar and strain.

The hollow axles 6, have live axles, 55, passing therethrough and rotatable therein, their divided ends passing into depressions, 56, within each side and at the center of the rotary member, 57, of the differential gear, 58, said axles having gear wheels, 59, rigidly attached near their divided ends, which gear with the wheels, 60, on the pintles, 61, said wheels 60, being secured on their pintles by the annular member 62, whose periphery gears with the compound idle gears, 63, supported upon the axles, 6, by the compound brackets, 64. The live axles 55, have gears 65, rigidly attached to their outer ends, which mesh and gear with gears, 66 and 67, which in turn mesh and gear with the gears, 68, rigidly attached to the hubs of the traction wheels, said gears 65, 66, 67, and 68, being housed within the hollow knuckle, 69, the part 70, and the part 71, being unitedly hinged together by the rod, 72, thereby, forming a two-part turn knuckle, said rod 72, thus keeping the divided live axles and differential gears in operative position. The knuckles 69, with the spindles 73, and hub orifices, 74, being a modification of the knuckles embraced in my co-pending application for patent, Serial No. 368,806. The rotary member 57, of the differential gear is provided with solid projections, which form the pintles 61, and extend a trifle beyond the gear-wheels 60, which being held on these pintles by the annular member 62, the various members and connections of the differential gear-axle are held perfectly in place, and operatively in position, without bolts, screws, or pins, the only securing means on the entire gear being the four countersunk screws, 75, which secure the four clasping countersunk flanges, 76, of the annular member, 62, to the rotary member 57, the side wheels, 59 so snugly fitting against the sides of the annular member, that the differential gear forms itself into a cased gear, thus producing the strongest, solid, simple, efficient gear, composed in its entirety, of only eight parts, insuring its easy running, integrity, and indestructibility.

The brackets 64, have horizontal members, 77, and 78, which unite to hold the axles 6, in operative position at their point of division, and complementary, with the perpendicular braces 79, 80, and 81, support and hold the gears, 63, and the steering axle 82, in operative position. The steering axles 82, have gears 83, at each of their ends, which mesh and gear with gears 84, rigidly attached to the lower outer halves of the two-part knuckles 69, and which turn the traction wheels when the steering axle 82 is rotated. Said steering axle is supportingly held in position by the compound brackets 64, and the compound brackets 85, which also have the horizontal brace, 86, and the perpendicular braces, 87, 88, 89. Said bracket 85, supporting the idle-compound gear, 90, which idle gear is adapted to, alternatively, gear, with either of the slidable gears, 91, or 92, rigidly fixed to the slidable sleeve, 93, said alternative steering mechanism being constructed as follows:—A reinforcing cylinder, 94, is rigidly affixed to the steering axles 82, to provide the annular grooves 95 and 96, upon which member 94, the slidable sleeve 93, having the shoulder, 97, at its extremity, which is fittingly rotatable within the collared annular groove, 98, formed at one end of the reciprocating sleeve, 99, provided with the perforation 100, the spring-bolt, 101, the spring 102, and the splined end 103, which permits the reciprocation of said sleeve within the space 104, provided in the bracket brace 89. Said slidable sleeve 93, is also provided with the annular shoulder 105, and the overfitting annular collar, 106, to which is operatively connected the reciprocating lever, 107, fulcrumed to the brace 88. The compound brackets 64 and 85, are triangular in form and substantially duplicates, and support the steering axles 82, in a parallel position, to the axles 6, in the following manner:— The duplicate braces 79 and 81, affixed, respectively, to the axles 6, and 82, as shown in Fig. 19, have a perpendicular middle member, 108, which unites the two axles, the horizontally extending member, 109, and the inclining member 81, forming the two triangular members, which uniting the horizontal member 77, comprising a compound bracket, the member 77, having a perforation 110, through which the pintle, 111, extending from the axle clasping portion, passes, and upon which the compound idle gears 63, are rotatable, the member 77, being reinforced by the curved middle member 80, thus providing unique, strong, simple, and reliable means to support and operate the driving and steering mechanism, and dispenses with the usual and objectionable shaftings.

The compound gears 63, which rotate the live-axles, through the differentials, 58, are flexibly geared, by the endless chain 112, with the compound gears, 113, rigidly attached to the hollow driving shaft 114, and mesh and gear with the intermediate compound gear, 115, which gear 115, is flexibly geared with the transmission shaft gear 54, and thus drives the traction wheels, when said transmission gear is rotated. The compound gear 63, and differential, 58, are duplicated on the duplicate axles, 6, and flexibly geared by the endless chain, 116, with the gear 117, rigidly secured to the other end of the hollow driving shaft 114, the duplicated driving mechanism being substantially, identical. Passing through, and rotatable within, the hollow driving shaft, 114, is the steering shaft 118, which has duplicate gears, 119, near both of its ends, which are flexibly geared with the duplicate compound idle gears 90, by the duplicate endless chains, 120. The steering shaft 118, is provided with duplicate gears 121, at its extremities, which mesh and gear with the duplicate intermediate gears, 122, which in turn mesh and gear with the duplicate worm gears, 123, operatively connected with the duplicate compound steering posts, 124. The compound driving and steering shafts, 114 and 118, are supportingly secured and united to, and directly beneath the platform, 1, by compound brackets, 125. This economic adjustment and location allowing ample space for the resilient action of the independently cushioned frames, and the mechanism mounted thereon. The worm 123, is secured within the socket, 126, by a ball 127, intermediate its stock, which ball permits said worm to oscillate into and out of operative gearing position, and is held out of operative gearing connection by the spring 128, to prevent any back locking of the steering mechanism, when the operator is driving the vehicle, from its duplicate opposite end. The said worm has a square shank, 129, at one extremity, provided with a conical end, said shank being adapted to securely fit within the key end of the steering post, when placed in operative position. Around the socket 126, is a thimble, 130, provided with an outward annular flange, 131, and an inwardly annular flange, 132. The thimble is surrounded by an annular plate, 133, provided with an annular depression, 134, in which rests the flange of the thimble, between which are located ball bearings, 135, said plate being secured by bolts, 135' to the floor of the housing-repositories 136, a flanged floor plate, 136', secured to the floor by screws 137, holding the thimble in place. A wheel, 138, is secured to the lower end of the thimble, by screw bolts, 139, through its annular flange, 140, said wheel being adapted to accommodate the cable 141, for moving the transmission wheel. The compound steering and speed varying posts 124, are constructed with a shaft, 142, provided with an enlargement, 143, at its lower end, with the key hole 144, which fits over the shank, 129, its outer perimeter being circular, and fitting snugly within the thimble. Said shaft 142, is provided with a steering wheel, 145, hinged to a projection, 146, which permits said wheel to swing toward the shaft, when the handle is detached for storing, in the housing repository, the upper rim of said wheel, being provided with minute, but readable projections, 147, that form a scale-dial. The shaft 142, is surrounded by the cylinder, 148, provided with an enlargement 149, which has inclined grooves 150, which register with ribs, 151, on the outer perimeter of the thimble. Projecting from the top of the cylinder is a pointing finger, 152, from which depends a handle, 153. This compound post rests in operative position by the force of gravity, and when in position holds the worm in gear with the intermediate gear-wheel.

At each end of the platform, and secured to the sidings 154, are guide-rails, 155, on which the gates 156, are hung, said gates being adapted to fold, slide, and swing around to the outside of the sidings, thereby producing an unobstructed vehicle body that may be simultaneously loaded and unloaded, at either or both ends. Said guide-rails permit the gates to be located and fastened in position, at the extreme end of the body, when the vehicle is operated at the opposite end, and it also enables the opposite gate to be secured across the duplicate and in the rear of the seat of the operator, when such seat is in seating position. This of course, would be the relative positions of the gates when the vehicle was operated from the other end.

The guide 44, is reciprocated by a cable 141, secured to one end of the guide and passing over the wheel 138, connected to the compound steering post thimble, said cable extending to the other end of the vehicle, passing over the duplicate wheel, 138, and returning, is secured to the other end of the guide, this guide being a sleeve that is supported by the guide-rail 157, which is fastened to the under side of the platform.

At each end of the platform are duplicate depressions, 158, provided with hinged covers, 159, that may serve when elevated as foot-rests, and when closed forming a part of the flooring of the platform. In these housing-repositories are located all the foot treadles for operating the vehicle and the duplicate compound steering and speed varying posts, said posts being laid and stored in one of said repositories, when not in operative position, when the vehicle is being driven and operated from its opposite end.

For vehicles of the type shown in Fig. 4, are provided at each end, the duplicate repositories, 160, for housing the operators' seats, 161. One side of said seats being cushioned, the other side forming the covers to the repositories, and part of the vehicle flooring when the seats are stored in the housings. This is accomplished by pivoting said seats in the end headers, 162, at their centers, 163, enabling the seats to be reversed by turning on the pivots at these points.

The numerals, 164, 165, represent supporting folding legs, so constructed that they will lie longitudinally in the platform as indicated by dotted lines at left end of Fig. 4, where one seat is shown reversed and closing the repository.

The speed of the vehicle depends upon, and is varied and indicated, by the general construction and arrangement, in the following manner:—A motor capable of giving a certain number of revolutions of its power-shaft, is so geared to the speed disk that, when said disk is rotated to its highest speed, the transmission wheel can be moved across the disk to the highest speed range of the disk, thus gaining by the most simple gearing means, a greatly increased speed for the vehicle. By the horizontal disposition of said disk and the increased width of the frame, permitted by the wheel ports, the diameter of the speed disk is, also, so greatly increased, that a much higher range of speed is secured, by a relatively lower percentage of motor horse-power, than is possible to attain by motor vehicles, of other construction, and, the additional advantage obtained, that the simple reciprocation of the transmission wheel across the disk, from center to circumference, in either direction, gives every number of speed ranges from zero to its highest limit, while the ordinarily constructed motor-vehicle possesses only three or four speed changes, controlled by cog-transmission gears, and their dangerous liability of "stripping".

The position of the transmission wheel 41, is indicated by the position of the finger 152, of the compound steering and speed varying posts, 124, beneath the steering wheel 145. When the position of the steering wheel is such as to cause the vehicle to run in a direction straight ahead and the finger 152, is pointing directly backward, the position of the transmission wheel is at the center of the disk, and consequently, the speed of the vehicle is zero, but, when the finger is moved forward toward the left, the speed will be increased until the finger points directly ahead, or is moved one hundred and eighty degrees of a circle, when the vehicle will have attained its highest speed, each variation of the speed being registered on the speed dial, by the position of the finger, the relation of the finger, and the speed dial, being illustrated in Fig. 20.

The duplicate, reversible two-part swivel jointed seats, 166, shown in Fig. 25, are provided for vehicles of the type illustrated in Fig. 2, each half seat being adapted to repose within the openings 167, at each end of the sidings, when not in seating position. Headers, 168, having extending lugs 169, that fit into eyes at the bottom of the openings, and form hinging means for the seats, are provided with the centrally located holes, 170, into which fit the pivots 171, on the ends of the seats, and form their swivel-joints. These half seats lap upon each other, and are supportingly united at their divided centers, by slidable side brace-bars 172, reciprocal in the channels 163, the corner indentures 174, permitting the seats to pass by, and then rest on the supports 175, which fit into the mortises, 176, on the other corners of the seats. Hand-bolts, 177, reciprocate in the bolt-holes 178.

It will be readily seen that my differential mechanism includes something more than a mere differential gear, that could be used in any shaft, but, that the conjoined union of the live and dead axles, turning knuckles, and gearing therein, are essential to hold the differential gear together in operative relation, the construction producing, in fact, a differential gear-axle.

The almost incalculable advantage of this vehicle to a commercial establishment, consists in the fact that the operator can clear his vehicle in a few seconds and unload, or load it at, or from, either end; can drive, operate, and steer it at, and from, either end; can steer it upon any radius of a circle,—it can be spun around like a top, can, alternatively, steer it, "sidewise", as readily, as forward and backward; that its high speed capacity, assures quick trips, prompt, and short deliveries; that its strong, reliable construction insures against "break-downs" on the "road"; its simplicity of operation and convenience of management permitting the operator to haul more loads in a shorter time; the few parts to be cared for, and low horse power, reducing the cost of maintenance; and the fact that the loaded vehicle can be driven by one end into narrow spaces and driveways, instantly cleared of all obstruction, and unloaded, and reloaded from, and at, both or either end, and operated, steered, and "driven out" from the opposite end, and continued upon the route, without "backing" or turning the vehicle around, insures alike, to the owner and operator a double-end, double operating,—two vehicles in one—really efficient, reliable, dependable motor-vehicle.

What I claim as new and desire to secure by Letters Patent is:—

1. A vehicle provided with a plurality of supporting wheels each wheel being pivotally secured to the vehicle and capable of being swung through an angle of one hundred and eighty degrees, steering mechanism operatively connected to swing the wheels upon their pivotal connection through an angle of one hundred and eighty degrees, the vehicle being provided with recesses or ports adapted to receive the wheels when swung thereinto.

2. A motor vehicle provided with a motor, four supporting traction wheels operatively connected to be rotated by the motor, and arranged in pairs, one pair of traction wheels located at each end of the vehicle, each traction wheel being pivotally connected to the vehicle and adapted to be turned on a vertical pivot at right angles to the longitudinal axis of the vehicle either to the right or to the left, connecting mechanism between each traction wheel of a pair to cause both traction wheels of the pair to be turned in the same direction, mechanism connecting each pair of traction wheels provided with operating handles at each end of the vehicle and also with shifting mechanism adapted to cause each pair of traction wheels to be turned in the same direction, or in the opposite direction whereby the vehicle may be moved either in circumferences of circles whose radii may vary from infinity to substantially the length of the vehicle or to be translated bodily on any radii of a circle, and operated at either end.

3. A motor vehicle provided with four supporting traction wheels secured to vertical pivots, a motor attached to the vehicle, operating mechanism connecting the motor and the traction wheels to rotate the traction wheels, mechanism connecting the traction wheels in pairs to turn the traction wheels by pairs at right angles to the longitudinal axis of the vehicle in either direction to the right or to the left, connecting mechanism provided with operating handles at each end of the vehicle, and shifting mechanism in operative relation with said connecting mechanism for permitting each pair of traction wheels to be turned in the same or in opposite direction either to the right or to the left of the longitudinal axis of the vehicle.

4. A vehicle provided with four supporting traction wheels arranged in pairs, steering mechanism connecting each pair of traction wheels provided with shifting mechanism adapted to permit each pair of traction wheels to be turned in the same direction either to the right or to the left of the longitudinal axis of the vehicle, or in opposite directions to said axis of the vehicle through an angle of ninety degrees in either direction from the longitudinal axis of the vehicle, and operating mechanism located at each end of the vehicle for the steering mechanism.

5. In a motor vehicle, duplicate axles, spindles hinged to the end of each axle, shafts parallel with the axles, gearing connecting the shafts to the spindles, a steering post located at each end of the vehicle, a shaft running at right angles to the axles adapted to be operated by the steering posts at each end, gearing connecting said shaft with each of the first mentioned shafts, means forming part of said connecting gearing to cause said first mentioned shafts to rotate in the same or opposite directions, whereby the spindles are caused to swing in the same or in the reverse direction.

6. In a motor vehicle, duplicate axles, spindles hinged to each end of the axles, shafts running parallel with each axle, geared to the spindles, a steering post located at each end of the vehicle, a steering shaft running at right angles to the axles provided with gears at each end each adapted to be operated by steering posts, other gears connected to the steering shaft, endless chains, passing over each of said last named gears, idle gears over which the endless chains pass, duplicate sleeves slidable upon each of the first mentioned shafts, gears fixed to each end of said sleeves, each sleeve being capable of rotating said shafts when the sleeves are rotated, means for sliding said sleeves to cause the gears on the ends of said sleeves to pass alternatively to operative connection with said idle gears.

7. A motor vehicle provided with four supporting traction wheels, each traction wheel pivotally connected to swing about a vertical axis through an angle of one hundred and eighty degrees, a motor operatively connected to rotate the four traction wheels simultaneously, steering mechanism connecting the traction wheels, shifting mechanism connected with the steering mechanism so that the traction wheels may all be swung in the same direction or two traction wheels may be swung in an opposite direction to the two other traction wheels.

8. A motor vehicle provided with four positively and simultaneously driven and positively and simultaneously steered traction wheels pivotally secured to the vehicle and capable of being swung through an angle of one hundred and eighty degrees, a motor for driving the traction wheels, steering mechanism adapted to be operated at each end of the vehicle for swinging the traction wheels, means at each end of the vehicle for controlling the motor.

9. A vehicle provided with four supporting wheels, steering control means located at each end of the vehicle on opposite sides of the central axis of the vehicle.

10. A motor vehicle having a floor or platform provided with a housing below the surface of the floor for storing the controlling mechanism and a cover for the housing flush with the surface of the floor when in closed position.

11. A vehicle provided with a plurality of supporting and steering wheels each rotatably secured to an axle, said axles being secured to the vehicle by vertical pivots and capable of being moved on said pivots through an angle of one hundred and eighty degrees, steering gear connected to move all the wheels on their vertical pivots simultaneously, operating means located at a plurality of positions on the vehicle connected to the steering gear and shifting mechanism connected to the steering gear to cause the steering gear to move all the wheels on their pivots either in the same direction or to move some of the wheels in an opposite direction to that of the other wheels.

12. A vehicle having a plurality of supporting and steering wheels one or more located at each end of the vehicle, steering gear connecting the wheels, operating mechanism for the steering gear located at each end of the vehicle, shifting mechanism connected to the steering gear adapted to permit the wheels located at one end of the vehicle to be steered in the same or the opposite direction to the wheels at the opposite end of the vehicle, and operating mechanism at each end of the vehicle for operating the shifting mechanism.

13. A vehicle having a pair of supporting and steering wheels at each end, said vehicle having wheel ports for permitting the wheels to enter when swung at right angles to the axis of the vehicle, mechanism connecting said wheels so that they are movable simultaneously on the axes of their respective joints, a knuckle joint for each wheel, a steering device for operating said connecting mechanism and for simultaneously swinging said wheels into their respective wheel ports.

14. A vehicle provided with four supporting and steering wheels arranged in pairs at each end of the vehicle, said vehicle being provided with a wheel port to accommodate each wheel when swung at right angles to the normal running position, a knuckle joint for connecting each wheel to the vehicle, mechanism connecting the wheels of each pair so that they must be swung in the same direction, mechanism connecting each pair of wheels, shifting mechanism connected to the connecting mechanism to permit the pairs of wheels to be swung in the same or in opposite directions, operating mechanism for the shifting mechanism and operating mechanism for the steering connection to swing the wheels into the ports at right angles to their normal position.

15. A motor vehicle provided with four supporting traction and steering wheels rotatably secured to spindles, spindles pivotally secured to the vehicle, a frame provided with wheel ports, steering gear connected to swing the spindles through an angle of one hundred and eighty degrees, shifting mechanism connected to the steering gear to permit two end wheels to be swung either in the same or opposite direction to the other two end wheels, a motor connected to rotate all four traction wheels, means to cause the traction wheels to rotate in reverse directions, said steering means, shifting means and reversing means adapted to be operated at both ends of the vehicle.

16. A motor vehicle provided with four supporting traction and steering wheels connected in pairs at each end of the vehicle, steering mechanism connecting the pairs of wheels and adapted to be operated at both ends of the vehicle, shifting mechanism connected to the steering mechanism adapted to permit one pair of wheels to be steered in the same or in the opposite direction and operated at each end of the vehicle.

17. A motor vehicle provided with traction wheels adapted to be swung through an angle of one hundred and eighty degrees and operating means adapted to be operated at either end of the vehicle for swinging the wheels.

18. A motor vehicle provided with traction wheels capable of being swung through an angle of one hundred and eighty degrees, means for rotating the wheels in either direction, means for swinging the wheels and means for shifting the swinging means so that some of the wheels may be swung in a direction opposite the other wheels.

19. A motor vehicle having a platform, steering posts located at each end of the vehicle on opposite sides of the central axis of the vehicle, duplicate motor controllers adjacent the steering posts, and duplicate displaceable seats mounted rearward of the steering posts.

20. A motor vehicle having a platform, steering posts located at each end of the vehicle, duplicate motor controllers adjacent the steering posts, and duplicate displaceable seats mounted rearward of the steering posts adapted to form part of the platform and be flush with the surface thereof when not in use as a seat.

21. A motor vehicle having a load supporting body provided with controlling means for the vehicle at each end thereof and doors or gates at each end of the body adapted to be opened and closed at each or both ends of the body.

22. A motor vehicle having a load supporting body provided with controlling means for the vehicle and seats for the chauffeur at each end of the body, end gates at each end of the body arranged to be closed at the end of the body and also to be moved to the rear of the seats into closed position and also to be moved free of the body whereby the load may be prevented from falling upon the seats and afford a free passageway for loading and unloading the vehicle.

23. A motor vehicle having a platform for supporting a load, means for controlling the movement of the vehicle at each end adapted to be operated by a chauffeur seated on the platform and means for housing of said means for controlling the movement of the vehicle whereby the ends of the platform may be free from any obstruction to passage of the load on or off at the ends of the platform.

In testimony whereof I hereby affix my signature in presence of two witnesses.

CHAS. BREWSTER STEELE.

Witnesses:
 ALEX. SCOTT,
 DANIEL W. EDELIN.